INVENTOR.
EDWARD P. BULLARD III
BY John H. Midney
ATTORNEY.

United States Patent Office 3,446,117
Patented May 27, 1969

3,446,117
RETRACTABLE TOOL SUPPORT
Edward P. Bullard III, Fairfield, Conn., assignor to The Bullard Company, Bridgeport, Conn., a corporation of Connecticut
Filed June 26, 1967, Ser. No. 648,884
Int. Cl. B23d 13/06, 7/08
U.S. Cl. 90—55                         5 Claims

ABSTRACT OF THE DISCLOSURE

A hydraulically or pneumatically operated metal-cutting tool support reciprocably movable between a retracted and an operative position and having an outer surface of rectangular cross section which slides within a closely fitting mating passage in a block adapted to be mounted on a machine tool platen or slide. A cylindrical bore in the tool support is operatively associated with a piston stationarily attached to the block forming a piston-cylinder arrangement by means of which the tool support is reciprocated. The mating rectangular surfaces of the tool support and block prevent transverse or twisting movement of the tool support relative to the block, thereby providing precise, rigid positioning of the tool support during metal cutting operations.

---

Figure 1:
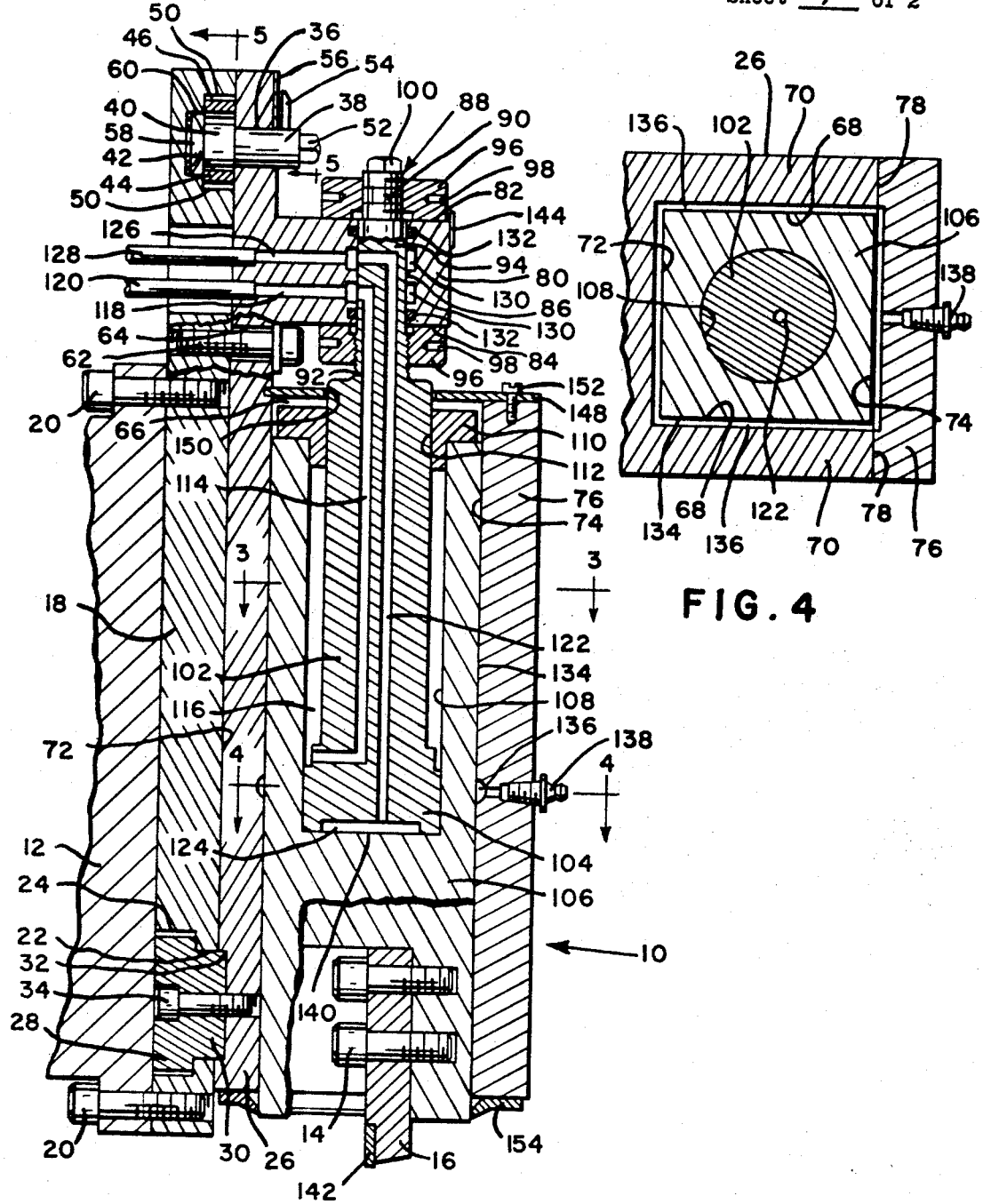

The present invention relates to a support for mounting a cutter element on a machine tool and has particular reference to an improved tool support reciprocably movable from a normally retracted to an extended operating position which rigidly supports the cutter against transverse or twisting movement during cutting operations.

Automatically controlled machine tools for accomplishing a series of operations, such as turning, facing, boring, etc., in succession on a workpiece in accordance with a programmed cycle require a number of different types of cutting tools for performing the various cutting operations. Generally, the multiple tools will be mounted on a slide or platen which is moved in a predetermined path for sequentially moving each tool into position to perform the desired machining operations in the planned order.

In programming the required movements of the machine slide or platen, it is often found desirable or necessary to maintain certain tools in a retracted position when not in use to preclude interference with the workpiece as the slide or platen is moved to position other tools for performing their particular operations. However, since retractable tool supports require that the member carrying the cutting tool be reciprocably or pivotally movable, supports of this type heretofore available have presented problems with regard to ensuring that the movable member is rigidly held in its desired operative position while the metal cutting operation is being performed. This problem is most serious in instances in which close tolerances and fine surface finishes are required, in which event even slight transverse or twisting displacements of the movable support member in its mounting, and corresponding displacements of the cutting tool, preclude the obtaining of the desired result.

Moreover, at the high rates of production for which automatic machine tools are generally designed, considerable quantities of metal chips are formed and thrown away from the workpiece. With the prior art retractable tool supports utilizing key and keyway, latch and finger, wedge and slot, and like arrangements for guiding the movable member of the tool support into proper operating position and locking the member in place, there is the possibility of chips penetrating into openings in the tool support mechanism and accumulating upon surfaces of the guiding and locking elements. Under such circumstances, proper positioning and locking of the tool support may be prevented with the possible consequences of improper machining of the workpiece, damage to or breaking of the cutting tool, or damage to other components of the machine tool and tool support.

Accordingly, an object of the present invention is to provide a retractable tool support mountable on a machine tool slide which rigidly maintains a cutting tool against twisting and transverse movements while functioning so as to produce accurate machining operations. Other objects include the provision of such a tool support which normally maintains a cutting tool mounted thereon in a retracted position until its use is required; which is reciprocably movable between a normally retracted and an extended operating position; which is reliable in operation and relatively unaffected by metal chips which may be deposited adjacent its movable parts; and wherein the operating position of a cutting tool mounted thereon may be adjustably positioned relative to the machine slide.

The above objects may be accomplished in the present invention by providing a block which is adjustably mounted on a base plate and has a longitudinally extending passage of rectangular cross section therein. A longitudinally extending rod has one end adjustably secured to the block and supports on its other end within the passage a cylindrical piston. A tool support is reciprocably mounted in the passage and has a cylindrical bore operatively associated with the piston and an outer surface of rectangular cross section closely fitting within the rectangular passage for sliding engagement therewith. One end of the tool support extends outwardly of the passage and has a cutting tool secured thereto. Two fluid conduits extending through the rod and piston communicate with the bore at the rod and head ends of the piston, respectively. Hydraulic fluid at a constant pressure is connected at all times to the rod end of the piston-bore arrangement to normally maintain the tool support in a retracted position. The tool support is intermittently moved to an extended operative position by connecting the head end of the piston-bore arrangement to the source of pressurized fluid, whereby by virtue of a greater effective area of the head end of the bore relative to the rod end thereof, the tool support is reciprocated to the operative position. In the extended position, the tool support and the cutting tool mounted thereon are firmly restrained against twisting or transverse movements relative to the block by the mating rectangular surfaces of the support and block. In the operative position, the tool support abuts against the piston and the operative position of the cutting tool may accordingly be longitudinally adjusted by adjusting the position of the piston and rod relative to the block. The adjustable mounting of the block to the base plate permits the block to be pivotally moved relative to the base plate, thereby providing for transverse adjustment of the cutting tool position relative to the base plate.

Numerous other objects and advantages of the invention will become apparent as it is better understood from the following description which, taken in connection with the accompanying drawings, discloses a preferred embodiment thereof.

Figure 2:
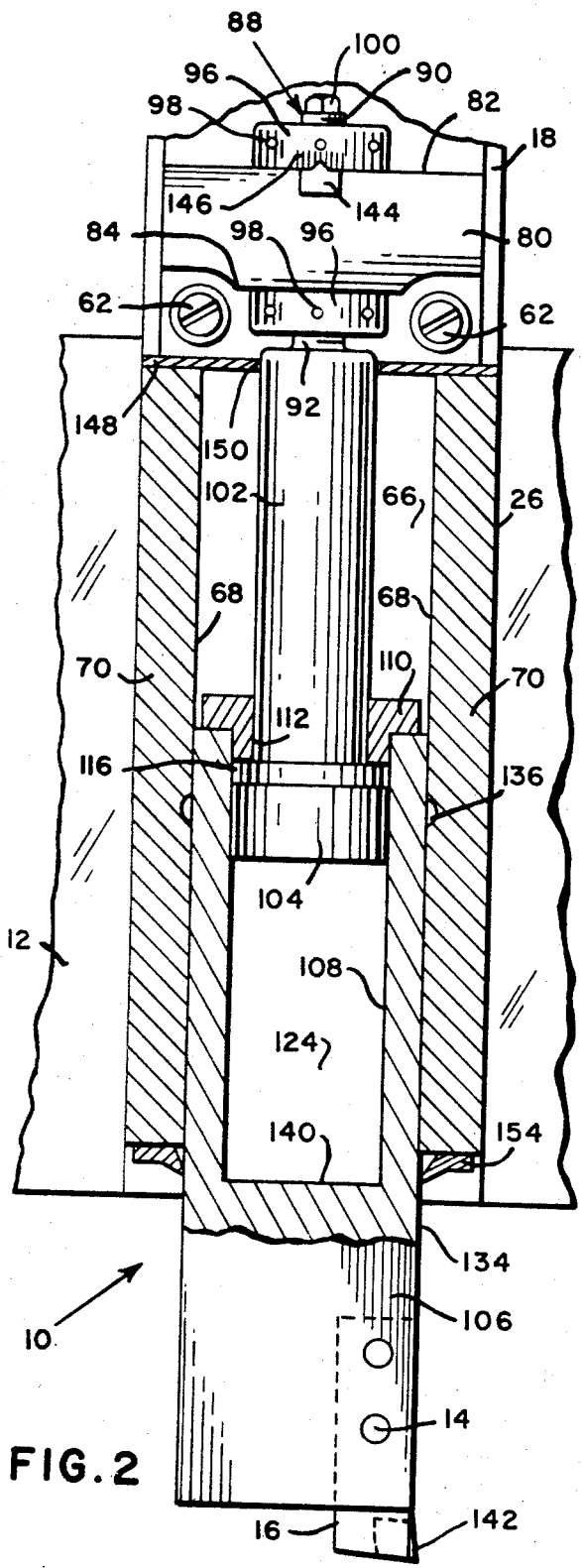
Figure 5:
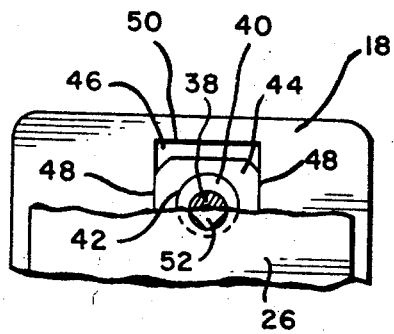
Figure 3:
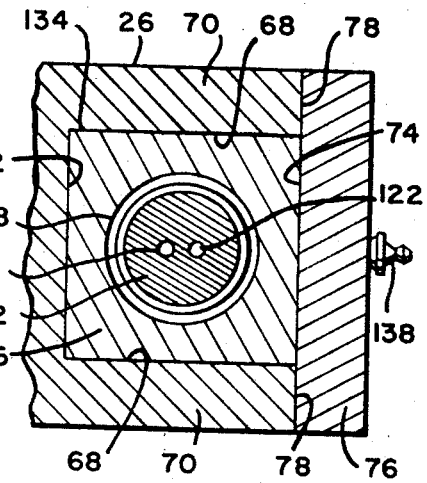

In the drawings:

FIG. 1 is a sectional view taken substantially along a vertical centerline of a retractable tool support embodying features of the present invention and showing the tool support member in the retracted position;

FIG. 2 is a front elevational view partially in section showing the tool support member in the extended operative position; and FIGS. 3, 4 and 5 are partial sectional views taken substantially along the lines 3—3, 4—4 and 5—5, respectively, of FIG. 1.

3

As a preferred or exemplary embodiment of the instant invention, FIGS. 1 and 2 show a retractable tool support generally designated 10 mounted on a slide 12 of a machine tool. The slide 12 may be movable along intersecting vertical and horizontal axes, whereby the tool support 10 can be moved universally in a vertical plane. The tool support 10 has secured thereto by screws 14 a cutting tool 16 which is normally held in a retracted position, as shown in FIG. 1, and moved when desired to an operative position as shown in FIG. 2. It is to be understood that the slide 12 may have mounted thereon other tool supports which may or may not be also retractable, adapted to be employed sequentially in a predetermined order to accomplish separate machining operations on a workpiece.

The tool support 10 has a base plate 18 which is secured to the slide 12 by screws 20. The base plate 18 has an opening extending therethrough consisting of a bored portion 22 and a counterbored portion 24. A block 26 is pivotally connected to the base plate 18 by a shouldered member 28 having a reduced diameter portion 30 journaled in the bore 22 and extending into and also journaled in an aligned bored portion 32 in the block. The member 28 is secured to the block 26 by a screw 34 which extends through a hole in the member to threadably engage the block. The length of the reduced diameter portion 30 of the member 28 is precisely equal to the combined lengths of the bored portions 22 and 32 in the base plate 18 and block 26, respectively, whereby the block is held in close frictional engagement with the base plate but is pivotally movable relative thereto.

A hole 36 extending through the upper portion of the block 26 journals a shaft 38. The shaft 38 has integrally connected thereto a cylindrical portion 40 that is eccentrically positioned relative to the axis of the shaft 38 and is journaled in a hole 42 in a rectangular shoe 44 that is mounted within a rectangular recess 46 in the base plate 18. The recess 46 includes two opposed sides 48 in sliding engagement with opposed sides of the shoe 44, and other opposed sides 50 which are spaced from the adjacent other opposed sides of the shoe (FIG. 5). Rotation of the shaft 38 and integral eccentric portion 40 in either direction accordingly causes the shoe 44 to exert a sidewise force on the base plate 18, resulting in a pivotal movement of the block 26 relative to the base plate about the axis of the member 28.

The shaft 38 has a squared end 52 adapted to be engaged by a suitable wrench, and a pointer 54 affixed thereto which cooperates with a calibrated scale 56 mounted on the adjacent surface of the block 26 to indicate the relative movement of the block and base plate, as will be more fully described hereinafter. A Belleville spring washer 58 positioned in a counterbored recess 60 in the base plate 18 exerts an axial force against the eccentric 40 so that a side surface thereof is pressed against an adjacent surface of the block to provide a rotational frictional force. Screws 62 extending through oversized holes 64 in the block 26 into aligned threaded holes in the base plate 18 are employed to securely clamp the block in a desired position relative to the base plate. The clearance between the oversized hole 64 and the shanks of the screws 62 permits limited movement of the block 26 relative to the base plate 18 when the screws are loosened and the shaft 38 is rotated.

The block 26 is provided with a longitudinally extending passage 66 of substantially rectangular cross section formed by opposed, precisely spaced, inwardly facing, parallel surfaces 68 of integral vertical ribs 70 and opposed, precisely spaced, inwardly facing, parallel surfaces 72 and 74 of the block 26 and a front plate 76, respectively. The front plate 76 may be fastened to front surfaces 78 of the ribs 70 in any suitable manner, such as by screws (not shown). The block 26 is also provided with an integral flange 80 extending over the upper end of the passage 66. The flange 80 has upper and lower surfaces 82 and 84, respectively, disposed substantially at

4 right angles to the longitudinal axis of the passage 66, and a cylindrical opening 86 axially aligned with the longitudinal axis of the passage.

A shaft 88 extending through the opening 86 has upper and lower threaded portions 90 and 92, respectively, and a cylindrical portion 94 intermediate the threaded portions closely fitting within the opening 86. Threaded collars 96 positioned on the upper and lower threaded portions 90 and 92 abut the surfaces 82 and 84 of the flange 80 to clamp the shaft 88 in an adjustably fixed position relative to the flange. The collars 96 are provided with holes 98 for engagement by a spanner-type wrench, and the shaft 88 has a squared end 100 engageable by a suitable wrench to effect longitudinal adjustment of the shaft relative to the flange 80 for purposes which will be more fully described hereinafter.

The shaft 88 is provided with an integral cylindrical piston rod 102 extending downwardly into the passage 66 and supporting therein a cylindrical piston 104. A tool holder 106 reciprocably mounted in the passage 66 has a cylindrical bore 108 in close fitting engagement with the piston 104. The bore 108 is sealed by an end cap 110 having an opening 112 therethrough in close fitting engagement with the piston rod 102. Conventional O-ring seals (not shown) are provided between the piston 104 and bore 108 and between the piston rod 102 and opening 112.

A passage 114 formed in the shaft 88 and piston rod 102 communicates with the rod end 116 of the bore 108 and is connected at all times by a passage 118 in the flange 80 and tubing 120 to a reservoir of hydraulic fluid maintained at a constant pressure. A second passage 122 extending through the shaft 88, piston rod 102 and piston 104 communicates with the head end 124 of the bore 108 and is intermittently connected by a passage 126 in the flange 80, tubing 128 and suitable control valving (not shown) to a reservoir of pressurized hydraulic fluid. Annular grooves 130 are provided in the opening 86 to ensure communication between the passages 114 and 118, and the passages 122 and 126, within the limits of adjustment of the shaft 88 relative to the flange 80. Conventional O-ring seals 132 prevent leakage of pressurized fluid outwardly between the adjacent surfaces of the opening 86 and the portion 94 of the shaft 88 disposed therein.

The tool holder 106 has an outer surface 134 of rectangular cross section closely fitting within the correspondingly shaped passage 66 in the block 26 with the surface 134 in precise sliding contact with the surfaces 68, 72 and 74 of the passage 66 (FIG. 3). A lubricant groove 136 extends about the periphery of the passage 66 and is connected to a lubricant fitting 138 for the purpose of introducing lubricant between the surface 134 of the tool holder and the adjacent surfaces 68, 72 and 74 of the passage 66 which are in sliding contact (FIG. 4).

Normally, the tubing 128 is connected through suitable valving to an exhaust reservoir at atmospheric pressure. Consequently, since the tubing 120 is connected at all times to the reservoir of hydraulic fluid maintained at a constant pressure, the tool holder 106 is normally held in the retracted position as shown in FIG. 1 by reason of the fluid pressure constantly acting on the end cap 110.

When it is desired to move the cutting tool 16 to the operative position, the tubing 128 is connected by suitable valving to a source of pressurized hydraulic fluid which, in the preferred embodiment, is the same fluid reservoir to which the tubing 120 is connected. The pressurized fluid acting on the surface 140 of the head end 124 of the bore 108 overcomes the upward force of the same pressurized fluid acting on the lesser effective area of the end cap 110 and moves the tool holder 106 and the cutting tool 16 mounted thereon downwardly toward the operative position. In the operative position of the tool holder 106, the end cap 110 abuts against the piston 104 (FIG. 2). Accordingly, the longitudinal position of the cutting tip 142 of the cutting tool 16 in the operative position may be adjusted by adjusting the position of the collars 96 on the shaft 88, thereby varying the longitudinal position of the piston 104 relative to the flange 80. A pointer 144 mounted on the flange 80 cooperates with scale markings 146 on the adjacent collar 96 calibrated to indicate longitudinal adjustment of the cutting tip 142 in one-thousandth inch increments.

Transverse adjustment of the cutting tip 142 in the operative position is effected by rotation of the shaft 38 in a manner hereinbefore described to pivot the block 26 relative to the base plate 18. Markings on the scale 56 are calibrated to indicate transverse movement of the cutting tip 142 relative to the base plate 18 in one-thousandth inch increments.

In order to prevent metal chips from entering into and accumulating within the passage 66, a cover plate 148 is provided at the upper end of the passage having an opening 150 of substantially the same diameter as the piston rod 102 through which the piston rod extends. The cover plate is secured to the front plate 76 by screws 152 and has one edge positioned within a locating groove in the block 26. Resilient wiper elements 154 mounted around the periphery of the lower end of the passage 66 in sliding contact with the outer surface 134 of the tool holder 106 prevent the entry of dirt or chips between the mating rectangular surfaces of the tool holder and block as the tool holder is reciprocated.

It will be readily apparent that in the retractable tool support structure disclosed, the reciprocably movable tool holder 106 is keyed to the stationary block 26 by the closely mating rectangular surfaces of the tool holder and block. Moreover, by virtue of the broad surface areas of these members which are in contact and the substantial spacing of these surfaces from the longitudinal axis of the tool holder, the tool holder and the cutting tool mounted thereon are strongly and rigidly supported against transverse or twisting deflections during metal cutting operations, and the tool support is fully capable of maintaining precise positioning of the cutting tool even when very large forces may be exerted on the cutting tool, e.g., when making heavy cuts at high speeds of operation. The tool support 10 of the present invention thus may be advantageously used where the cutting tool must be retractable when not in use in order to permit other tooling to perform its functions and where at the same time the tool support must be capable of maintaining precise positioning of the cutting tip without deflection or chatter in order to meet close dimensional tolerances and surface finish requirements of the workpiece. As a further advantage, in the retractable tool support disclosed, the movable elements are well protected against the entry and accumulation of dirt and chips which may detrimentally affect the accurate functioning of the tool support or possibly result in damage to its operating parts.

Upon the completion of a machining operation by the tool 16, the tool holder 106 is moved to the normal retracted position by manipulation of control valving which connects the tubing 128 to an exhaust reservoir maintained at atmospheric pressure. Immediately thereupon, the pressurized fluid constantly acting upon the end cap 110 automatically moves the tool holder 106 back to the normal retracted position.

It is thought that the invention and many of its attendant advantages will be understood from the foregoing description and it will be apparent that various changes may be made in the form, construction and arrangement of the parts without departing from the spirit and scope of the invention or sacrificing all of its material advantages, the form hereinbefore described being merely a preferred embodiment thereof.

What is claimed is:

1. Retractable tool supporting apparatus for a machine tool, comprising a base plate adapted to be secured to a machine tool, a block mounted on said base plate, a longitudinally extending passing in said block having a uniform substantially rectangular transverse cross section, a tool support member reciprocably mounted in said block for limited longitudinal movement between retracted and operative positions, a portion of said member having a substantially rectangular cross section closely fitting within said rectangular passage of said block to restrain said member against transverse movement relative to said block, a longitudinally extending cylindrical bore in said member, piston means stationarily mounted on said block including a cylindrical piston element disposed within said bore, and means for introducing pressurized fluid into said bore adjacent the respective sides of said piston element to move said member between the retracted and operative positions, said piston means includes a piston rod connected to said block and supporting said piston element, said cylindrical bore having an end closure with an opening therethrough sealingly engaging said rod, a tool having a cutting tip mounted on said tool support member at the end thereof opposite said end closure, the limit of movement of the tool support member toward the operative position and the longitudinal positioning of said cutting tip in the operative position being established by the abutment of said end closure against the adjacent one side of said piston element, said piston rod being adjustably connected to said block whereby the longitudinal position of said piston element, and thereby the longitudinal position of said tool support member and cutting tip in the operative position, are adjustably variable.

2. The tool supporting apparatus set forth in claim 1 wherein fluid passage means are formed in said piston means for continuously admitting pressurized fluid into said bore between said end closure and the adjacent one side of said piston element to maintain said tool support member in a retracted position and for intermittently admitting pressurized fluid into said bore adjacent the other side of said piston element to move said tool support member to an operative position.

3. The tool supporting apparatus set forth in claim 2 wherein the effective area of said one side of said piston element is less than the effective area of said other side thereof and said pressurized fluid is maintained at constant pressure, whereby admission of said fluid into said bore adjacent said other side of said piston element automatically moves said tool support member to the operative position.

4. The tool supporting apparatus set forth in claim 1 wherein the adjustable connection between said piston rod and said block comprises a flange portion of said block having an opening therethrough, an extension of said rod disposed in said opening, and a pair of collars threadably engaging said rod extension and clamping said flange portion therebetween, whereby the position of said piston element relative to said block can be varied by adjustably positioning said collars on said rod extension.

5. The tool supporting apparatus set forth in claim 1 additionally including means pivotally mounting said block on said base plate, and rotatable eccentric means between said block and said base plate for varying the angular position of said block relative to said base plate to adjust the transverse position of said cutting tip relative to said base plate.

References Cited

UNITED STATES PATENTS

| | | | |
|---|---|---|---|
| 2,353,488 | 7/1944 | Mueller | 83—639 X |
| 3,152,514 | 10/1964 | Olson | 90—55 |
| 3,269,222 | 8/1966 | Bullard | 77—58.3 |

ANDREW R. JUHASZ, *Primary Examiner.*

G. WEIDENFELD, *Assistant Examiner.*

U.S. Cl. X.R.

077—058